Oct. 19, 1937.  E. E. HEWITT  2,096,493
ELECTROPNEUMATIC BRAKE
Filed Aug. 5, 1936  2 Sheets-Sheet 2
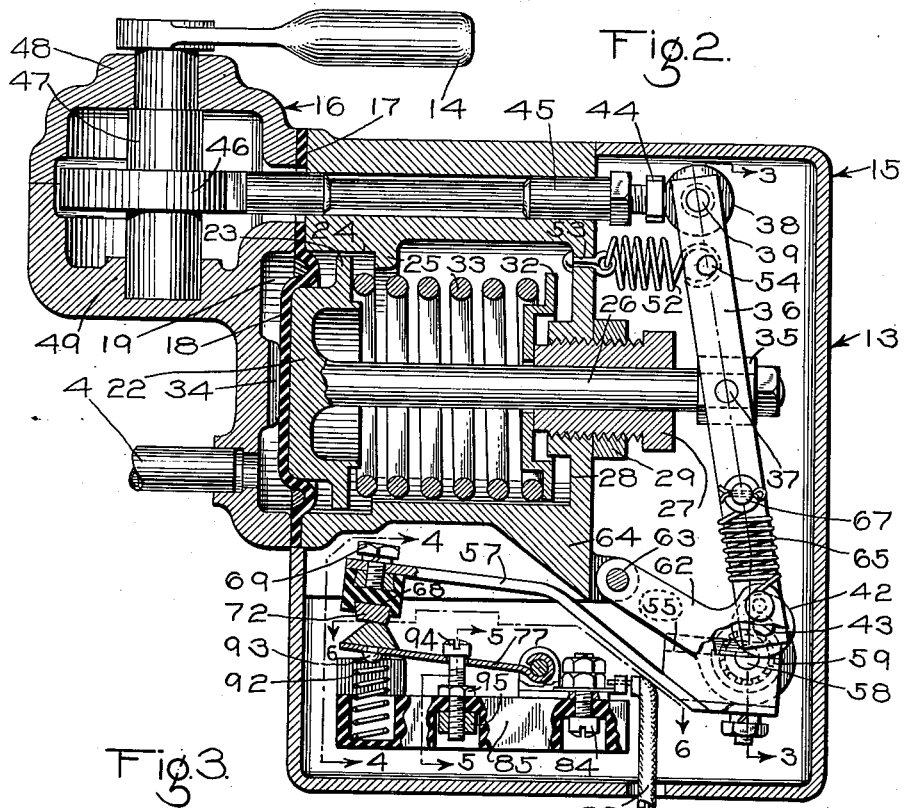
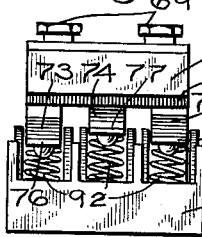
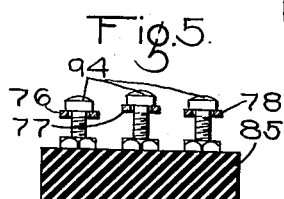
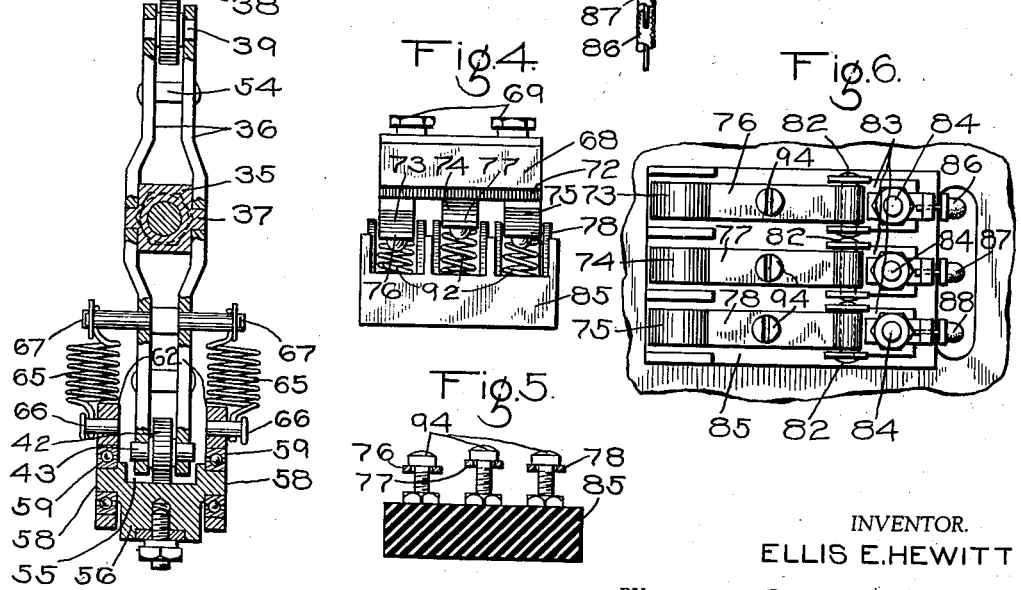
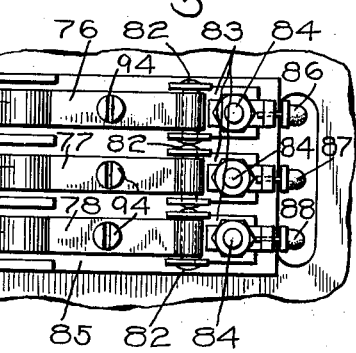
INVENTOR.
ELLIS E. HEWITT
BY
ATTORNEY.

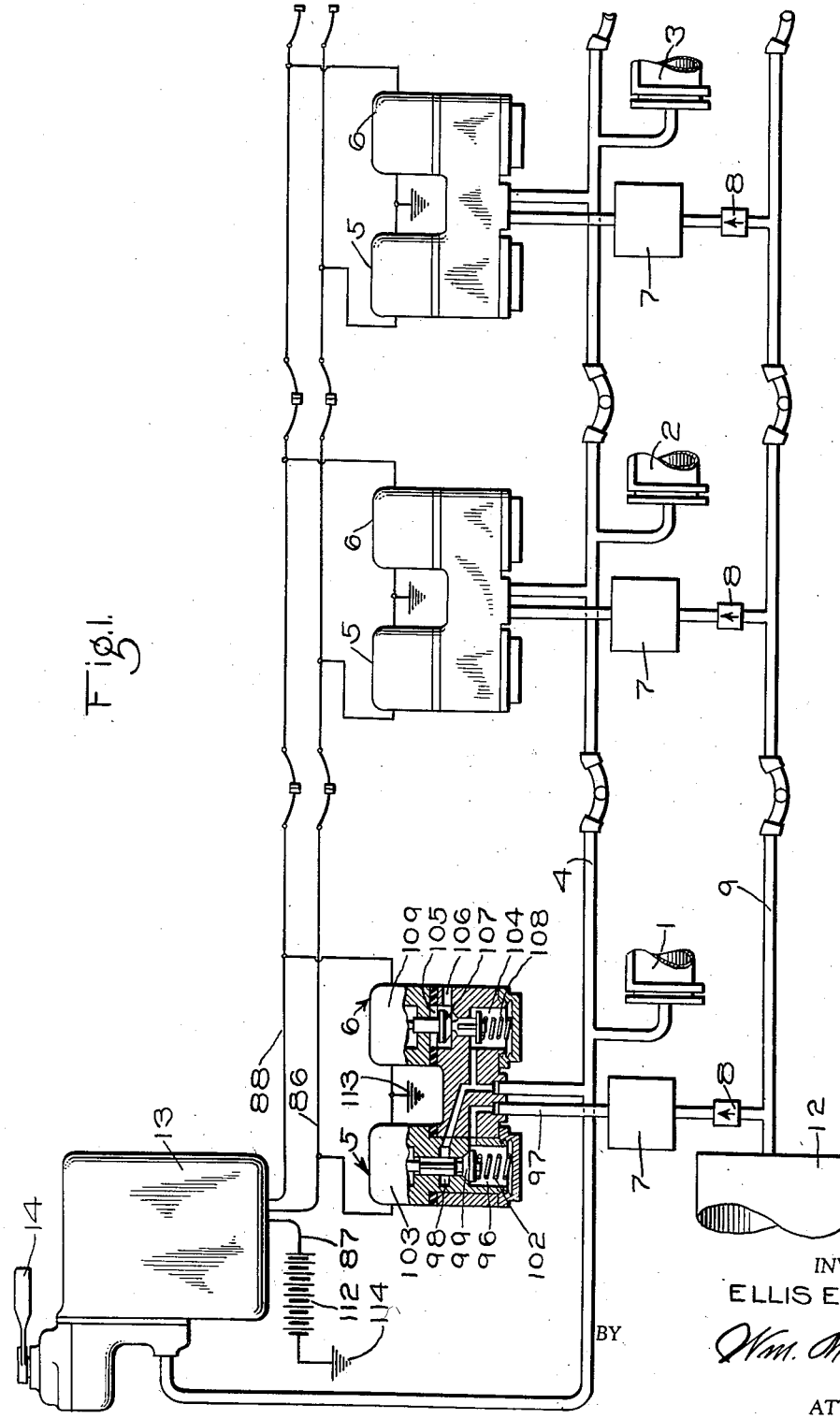

Patented Oct. 19, 1937

2,096,493

UNITED STATES PATENT OFFICE 2,096,493

ELECTROPNEUMATIC BRAKE

Ellis E. Hewitt, Edgewood, Pa., assignor to The Westinghouse Air Brake Company, Wilmerding, Pa., a corporation of Pennsylvania Application August 5, 1936, Serial No. 94,373

7 Claims. (Cl. 303—20)

This invention relates to brake equipment and more particularly to brake equipment for high speed railway trains and traction vehicles.

Modern conditions require that railway trains and traction vehicles be operated at relatively high speeds. When such trains and vehicles are operated at high speed, a braking equipment must be provided which combines a high degree of reliability with flexibility so that the train or vehicle can be handled with the utmost regard to safety.

In braking equipment of the above indicated character magnet valve devices are provided for controlling the supply of fluid under pressure to, and the release of fluid under pressure from, the straight air pipe in accordance with the operation of a self-lapping brake valve device that is provided for controlling the degree of application of the brakes in accordance with the amount of movement of the handle of the brake valve device from its release position.

It is an object of my invention to provide a self-lapping brake valve device provided with contact members controlled in accordance with the movement of the brake valve handle from its release position, to control supply magnet valve devices and release magnet valve devices throughout the train for effecting a corresponding supply of fluid under pressure to, and release of fluid under pressure from, the straight air pipe at a plurality of points along the train.

Other objects and advantages of my invention will be apparent from the following description of one preferred embodiment of the invention, reference being had to the accompanying drawings.

In the drawings,

Fig. 1 is a diagrammatic view of brake equipment organized in accordance with my invention, Fig. 2 is a sectional view through the brake valve device illustrated in Fig. 1, Fig. 3 is a sectional view taken on the line 3—3 in Fig. 2.

Fig. 4 is a view taken on the line 4—4 in Fig. 2,

Fig. 5 is a view taken on the line 5—5 in Fig. 2, and

Fig. 6 is a view taken on line 6—6 in Fig. 2.

Referring to Fig. 1 of the drawings the brake equipment therein illustrated comprises a plurality of braking units identified by the brake cylinders 1, 2 and 3, respectively, that are supplied with fluid under pressure from a common straight air pipe 4 in accordance with the operation of an application magnet valve device 5 associated with each braking unit for controlling the supply of fluid under pressure to the straight air pipe 4 from the local supply reservoir 7 associated with each braking unit, as supplied thereto through check valve 8 and a main reservoir 9 from a main reservoir 12. A release magnet valve device 6 is also associated with each braking unit for controlling the release of fluid under pressure from the brake cylinders 1, 2, and 3, and the straight air pipe 4. The operation of the magnet valve devices 5 and 6 is controlled by a brake valve device 13 in accordance with the movement of the brake valve handle 14.

Referring to Figs. 2 to 6, inclusive, the brake valve device 13 comprises a casing having a body portion 15 and an actuating portion 16 that are separated by a gasket 17 having a diaphragm portion 18 forming one wall of a diaphragm chamber 19 that is in constant open communication with the straight air pipe 4. A diaphragm follower 22 is positioned adjacent the diaphragm 18 and is provided with an outwardly extending flange 23 adapted to move in a bore 24 in the casing portion 15. An inwardly extending shoulder 25 limits the movement of the follower toward the right. The follower 22 is provided with a stem 26 extending through a bore in a cap nut 27 that is screw-threadedly attached within a bore in the wall 28 of the casing and is held in position by a lock nut 29.

A cross-head 35 is provided on the end of the follower stem 26, to which a beam 36 is pivotally mounted by the trunnions 37, the beam or lever 36 comprising a pair of spaced members between the upper ends of which a roller 38 is carried by a pin 39, and between the lower ends of which a roller 42 is carried by a pin 43. The roller 38 is adapted to engage the head of a bearing stud 44 that is screw-threadedly attached within a bore in the end of a cam plunger 45 positioned within a bore in the casing, the opposite end of which is adapted to engage a cam 44 carried on a shaft 47 and positioned in bearings 48 and 49 of the casing, the shaft 47 being connected to be actuated by the brake valve lever 14. The roller 38 is normally held in engagement with the stud 44 by means of a spring 52, one end of which is fastened by an eyelet 53 to the wall 28 of the casing structure, and the other end of which is attached to a pin 54 extending between the spaced members of the beam 36.

The roller 42 at the lower end of the beam 36 is adapted to roll along a surface 55 formed on a block 56, comprising part of a contact carrying lever 57 that is supported by trunnions 58 and ball bearings 59 from a pair of arms 62, the inner ends of which are attached by a pin 63 to a bracket 54 in the casing structure. The block 56 is biased into engagement with the roller 42 by a pair of springs 65 on opposite sides of the beam 36, the lower ends of which engage pins 66 in the arms 62 and the upper ends of which are attached to pins 67 carried by the beam 36.

At the outer or left hand end of the contact carrying lever 57 an insulating block 68 is attached by means of bolts 69 for carrying a contact member 72 that is adapted to engage the contact members 73, 74, and 75 carried, respectively, by contact fingers 76, 77, and 78 that are mounted on pivot pins 82 carried in similar supporting members 83 that are attached by means of terminal bolts 84 to an insulating block 85 mounted within the casing portion 15. The contact fingers 76, 77, and 78 are connected respectively to conductors 86, 87, and 88 to control circuits to be later described.

The contact fingers 76, 77, and 78 are biased upwardly by similar springs 92 positioned under the outer end thereof, the upper ends of which are positioned about knobs 93 on the under side of the contact finger and the lower ends of which are positioned in recesses in the insulating block 85. Adjusting bolts 94 are provided for each of the contact fingers 76, 77, and 78 that extend through openings therein and are made adjustable by means of nuts 95, the heads of the adjusting bolts 94 being positioned to hold the contact fingers 76, 77 and 78 to different limits of upward movement for a purpose to be presently made clear.

The application magnet valve device 5 comprises a casing containing an application valve chamber 96 that is in constant communication with the supply reservoir 7 through passage and pipe 97, and a chamber 98 that is in constant open communication with the straight air pipe 4. An application valve 99 is contained within the chamber 96 for controlling communication from the reservoir 7 to the straight air pipe 4. The valve 99 is normally biased to its seated position by a spring 102 contained within the chamber 96, and is adapted to be forced from its seat against the bias of the spring 102 upon the energization of a magnet 103 contained in the upper part of the casing.

The release magnet valve device 6 comprises a casing containing a chamber 104 that is in constant communication with the straight air pipe 4, and a release chamber 105 that is in constant communication with the atmosphere through exhaust port 106, and which contains a release valve 107 that is normally urged upwardly from its seat by a spring 108 contained within the chamber 104, and that is adapted to be urged downwardly to its seat against the bias of the spring 108 upon the energization of a magnet 109 contained in the upper part of the casing structure.

The several admission valve chambers 96 of the application magnet valve devices 5 and the local supply reservoir 7 are maintained charged with fluid under pressure by the flow of fluid under pressure thereto from a main reservoir 12 through main reservoir pipe 9 and a one-way check valve 8.

When the brakes are released the several illustrated parts of the equipment are in the positions shown in the several figures of the drawings. If the operator wishes to apply the brakes the brake valve handle 14 is moved from release position an amount depending upon the desired degree of application of the brakes. The face of the cam 46 is so shaped as to force the cam plunger 45 toward the right against the bias of the spring 52 an amount depending upon the degree of movement of the handle 14 and of the cam 46 from their release positions. As the cam and the cam plunger 45 are so moved the beam 36 will rock about the trunnions 37 against the bias of the spring 52, the roller 42 at the lower end of the beam being moved toward the left. It will be noted that, in the position of the parts shown in Fig. 2, the roller 42 engages the surface 55 at a point to the right of the center of the trunnions 58 upon which the contact carrying lever 57 fulcrums, so that the upward bias of the arms 62 by the springs 65 causes the roller 42 to exert a downward force on the block 56 to the right of the fulcrum point of the lever 57 as viewed in Fig. 2, thus biasing the lever 57 in a clockwise direction to its illustrated position.

Upon the inward movement of the lower end of the beam 36, and of the roller 42, as the point of contact between the roller 42 and the surface 55 passes the fulcrum point corresponding to the center of the trunnion 58 the force of the springs 65 will thereafter cause movement of the contact carrying lever 57 in a counterclockwise direction to move the contact member 72 carried at the end thereof downwardly, the force of this downward movement being determined by the position of the roller 42 with respect to the fulcrum point of the lever 57 which determines the leverage effect of the biasing springs 65.

It will be noted that the adjustment of the several adjusting bolts 94 are such that the contact member 74 carried by the contact finger 77 is permitted to rise to a higher level than the contact members 75 and 76, and that the contact member 75 carried by the contact finger 78 is permitted to rise to a higher level than the contact member 73. As the contact member 72 is moved downwardly, by movement of the roller 42 toward the left as viewed in Fig. 2, the contact member 72, which may be in engagement with the contact member 74, will, upon a slight downward movement, bridge contact members 74 and 75 to close a circuit from the positive terminal of the battery 112 through conductor 87, contact finger 77, contact members 74, 72 and 75, contact finger 78, the release conductor 88, the magnets 109 in the several release magnet valve devices 6 to ground at 113, and to the grounded terminal 114 of the battery 112, to energize the magnet 109 and force the release valve 107 downwardly to close communication between the straight air pipe 4 and the atmosphere through exhaust port 106.

Upon a slight further movement of the roller 42 toward the left, and a slight further downward movement of the contact member 72, a circuit is completed from the battery 112 through conductor 87, contact finger 77, contact members 74, 72, and 73, contact finger 76, and application conductor 86, the windings of the several magnets 103 in the application magnet valve devices 5, to ground at 113, and to the grounded terminal 114 of the battery 112 to energize the magnets in the application magnet valve devices 5 and force the application valve 99 downwardly against the bias of the spring 102 to effect the supply of fluid under pressure from the supply reservoir 7 through application valve chambers 96, chamber 98 and straight air pipe 4 to brake cylinders 1, 2, and 3.

As the pressure in the straight air pipe 4 and in the brake cylinders 1, 2, and 3 builds up, the pressure in the diaphragm chamber 19 of the brake valve device 14 correspondingly builds up to exert a correspondingly increasing pressure against the diaphragm 18 and the follower 22 to force the follower toward the right against the bias of a graduating spring 33 an amount depending upon the degree of increase in fluid pressure.

As the follower 22 and the stem 26 are moved toward the right the roller 38 at the upper end of the beam 36 is held in engagement with the stud 44 by the spring 52, the beam 36 pivoting about the roller 38, thus causing the roller 42 at the lower end of the beam 36 to be moved toward the right. As the roller 42 approaches the fulcrum of the contact carrying lever 57 the contact member 72 will be moved upwardly out of engagement with the contact member 73, thus interrupting the circuit through the application conductor 86 and magnets 103 of the application magnet valve devices 5 and permitting the application valves 99 to be forced to their seats by the springs 102. With this position of the roller 42 the application valves 99 and the release valves 107 are in lap position, thus maintaining the established pressure in the brake cylinders and the straight air pipe 4, and preventing an increase or decrease in such pressure. The particular pressure required in the straight air pipe 4, and in the diaphragm chamber 19, to move the beam 36 to a position to effect the lapping of the application valves 99 is determined by the amount of movement of the cam 46 and of the brake valve lever 14 from their release positions which effects a corresponding movement of the roller 38 toward the right from its release position. The further the roller 38 is moved toward the right from its release position the greater will be the amount of movement of the beam 36 in a clockwise direction about the trunnion 37 to effect the initial application of the brakes and correspondingly the further will be the position of the roller 42 from the point on the surface 55 corresponding to the fulcrum of the lever 57, and consequently the greater will be the movement of the diaphragm 18, and of the follower 22 against the bias of the graduating spring 33 to move the beam 36 about the fulcrum point 39 in a counterclockwise direction to bring the roller 42 to a position sufficiently close to the fulcrum of the lever 57 to cause the contact member 72 to separate from the contact member 73.

If the operator wishes to release the brakes the lever 14 is moved to its release position, thus permitting the roller 38 at the upper end of the beam 36 and the cam plunger 45 to be urged toward the left by the spring 52, the beam 36 being rocked in a counterclockwise direction about the trunnion 37 to move the roller 42 at the lower end thereof to the right of the fulcrum point of the lever 57 to move the left hand end of the lever, as viewed in Fig. 2, upwardly to separate the contact member 72 from the contact member 75 and thus interrupt the above traced circuit through the conductor 88 and the magnets 109 of the release magnet valve devices 6. Upon the deenergization of the magnet 109 each release valve 107 is forced to its upper or illustrated position by the spring 108 to effect the release of fluid under pressure from the brake cylinders 1, 2, and 3 and straight air pipe 4 to the atmosphere through exhaust port 106. As fluid under pressure is released from the straight air pipe 4, and from the diaphragm chamber 19 the diaphragm follower 22 and the cross-head 35 is moved toward the left until the diaphragm engages the stop 34, thus bringing the several parts of the brake valve device to the positions illustrated in Figs. 2 to 6.

If, after the brakes have been applied, the operator wishes to increase the degree of application of the brakes the handle 14 is moved further from the release position, thus moving the cam 46 and the cam plunger 45 further toward the right to again rock the beam 36 in a clockwise direction about the trunnion 37 to again cause the contact member 72 to engage the contact member 73 to again energize the windings of the magnets 103 of the magnet valve devices 5 to effect a further supply of fluid under pressure to the straight air pipe 4, the brake cylinder and the pressure chamber 19 until the pressure therein has again increased sufficiently to cause the contact member 72 to separate from the contact member 73 and permit the application valves 99 to move to lap position as above described. Also, if, after the brakes have been applied, the operator wishes to make a partial reduction in brake cylinder pressure the handle 14 may be moved toward release position an amount corresponding to the desired reduction, thus causing separation of the contact members 72 and 75 and deenergization of the windings of the magnets 109 of the release magnet valve devices 6 and the movement of the release valves 107 by the springs 108, to effect the release of fluid under pressure from the straight air pipe 4, the brake cylinders and the diaphragm chamber 19, to the atmosphere through exhaust port 106 until the pressure in the chamber 19 has been decreased sufficiently to permit movement of the diaphragm 18 and the follower 22 toward the left, and a sufficient movement of the beam 36 in a clockwise direction about the pin 39 as a fulcrum, to again cause the contact member 72 to engage the contact member 73. As the contact member 72 engages the contact member 73, the circuit through the winding of the magnets 109 of the release magnet valve devices 6 is again established causing the release valves 107 to be moved to their seats and close communication from the straight air pipe 4 to the atmosphere to retain the existing pressure in the brake cylinders 1, 2, and 3, the straight air pipe 4, and the diaphragm chamber 19.

It will be understood from the above description of the invention that the operation of the contact carrying lever 57 by the spring toggle mechanism at the lower end of the beam 36 as this beam is actuated by the cam plunger 45 and the follower stem 26 effects operation of the application and release magnet valve devices 5 and 6, respectively, to produce a self-lapping brake equipment. It will also be noted that the contact members of the brake valve device 13 are contained in a chamber that does not communicate with the pressure chamber 19 so that the contact members are not subject to moisture or dirt which may be present in the straight air pipe.

While I have illustrated and described one preferred embodiment of my invention it will be apparent to those skilled in the art that many modifications may be made within the spirit of my invention and I do not wish to be limited otherwise than by the scope of the appended claims.

Having now described my invention, what I claim as new and desire to secure by Letters Patent, is:

1. In a brake equipment for vehicles, in combination, a plurality of braking units comprising a brake cylinder, a common straight air pipe for controlling the degree of application of the brakes, magnet valve devices associated with each braking unit and operative for effecting the supply of fluid under pressure to, and the release of fluid under pressure from, said straight air pipe, and a brake valve device for controlling said magnet valve devices, said brake valve device comprising contact means for controlling said application and release magnet valve devices and actuating means therefor comprising a lever having a roller surface thereon and a fulcrum point, a beam having a roller on one end thereof for engaging said roller surface, toggle mechanism having means for biasing said lever to cause engagement of said roller surface with said roller for actuating said lever in accordance with the movement of said roller with respect to said fulcrum point, manually operable means for actuating said end of said beam in one direction upon movement thereof from its release position, and means responsive to brake cylinder pressure for actuating said end of said beam in the other direction.

2. In a brake equipment for vehicles, in combination, a plurality of braking units each comprising a brake cylinder, a common straight air pipe for controlling the degree of application of the brakes, magnet valve devices associated with each braking unit and operative for effecting the supply of fluid under pressure to, and the release of fluid under pressure from, said straight air pipe, and a brake valve device for controlling said magnet valve devices, said brake valve device comprising contact means for controlling said application and release magnet valve devices including a lever having a surface extending past the fulcrum thereof, a roller for engaging said surface, and biasing means for urging said surface into engagement with said roller, and means for actuating said roller along said surface from one side to the other of said fulcrum point for causing movement of said lever in the one or the other direction.

3. In a brake equipment for vehicles, in combination, a brake cylinder, a brake valve device having control means for controlling the supply of fluid under pressure to and from the brake cylinder comprising a control lever, a beam operatively connected to said control lever by a spring toggle mechanism comprising a roller carried by one end of said beam, a roller surface on said lever, and spring biasing means for urging said lever toward said beam, manually operable means for moving one point of said beam about a fulcrum point an amount corresponding to the desired degree of braking, and fluid pressure responsive means for moving said first named fulcrum point in accordance with the degree of application of the brakes to effect a reverse movement of said roller to operate said control lever to cut off the supply of fluid under pressure to said brake cylinder.

4. In a brake equipment for vehicles, in combination, a plurality of braking units each comprising a brake cylinder, a straight air pipe common to all braking units for controlling the degree of application of the brakes, means for controlling the pressure in said straight air pipe comprising magnet valve devices associated with each braking unit and a brake valve device having circuit controlling means for controlling said magnet valve devices pivotally mounted in one end of a supporting arm structure, the other end of which is pivotally mounted to the casing of said brake valve device, an operating member having a roller adapted to engage a roller surface provided on said circuit controlling means, and biasing means for urging said circuit controlling means toward said operating member, manually operated means for moving said roller along said roller surface to vary the point of contact therebetween with respect to the line of the force exerted by said biasing means, and means responsive to straight air pipe pressure for also moving said roller.

5. In a brake equipment for vehicles, in combination, a plurality of braking units each comprising a brake cylinder, a straight air pipe common to all braking units for controlling the degree of application of the brakes, means controlling the pressure in said straight air pipe comprising magnet valve devices associated with each braking unit and a brake valve device having circuit controlling means for controlling said magnet valve devices that is pivotally mounted in one end of a supporting arm structure the other end of which is pivotally mounted in the casing of the brake valve device, toggle mechanism for actuating said circuit controlling means comprising a lever and biasing means for resiliently connecting said lever and said circuit controlling means, manually operable means for actuating said lever to effect a circuit control operation of said circuit control means, and pressure operated means responsive to the resulting change in brake cylinder pressure for effecting an opposite movement of said circuit controlling means.

6. In a brake equipment for vehicles, in combination, a plurality of braking units each comprising a brake cylinder, a straight air pipe common to all braking units for controlling the degree of application of the brakes, means for controlling the pressure in said straight air pipe comprising a brake valve device having a lever therein and a circuit controlling member controlled thereby, said circuit controlling member having a roller surface thereon, a roller on said lever being adapted to engage said surface, and, toggle mechanism connected to said lever and circuit controlling member and cooperating with said roller to actuate said circuit controlling member for controlling the supply of fluid under pressure to and from said straight air pipe, manually operable means for actuating one point of said lever to operate said toggle mechanism to effect a change in straight air pipe pressure, and pressure operated means subject to straight air pipe pressure for actuating said lever to operate said toggle mechanism to arrest the change in straight air pipe pressure upon a predetermined pressure therein determined by the amount of movement of said manually operable means.

7. In a brake equipment for vehicles, in combination; a plurality of braking units each comprising a brake cylinder, a straight air pipe common to all braking units for controlling the degree of application of the brakes, means controlling the pressure in said straight air pipe comprising magnet valve devices associated with each braking unit and a brake valve device having circuit controlling means for controlling said magnet valve devices comprising a lever mechanism having one end pivotally mounted in the brake valve casing and the other end freely movable and pivotally attached to a control lever having a roller surface thereon, a toggle mechanism comprising a beam having a roller at one end thereof for engaging said surface and biasing means connecting said lever mechanism and said beam to force said roller surface into engagement with said roller; manually operable means for actuating said means to effect a circuit controlling operation of said circuit controlling means, and pressure operated means responsive to the resulting change in brake cylinder pressure for effecting an opposite movement of said circuit controlling means.

ELLIS E. HEWITT.